March 15, 1949. W. C. HALLEY 2,464,503
ELEVATING CASTER DEVICE FOR FURNITURE
Filed April 5, 1946 2 Sheets-Sheet 1
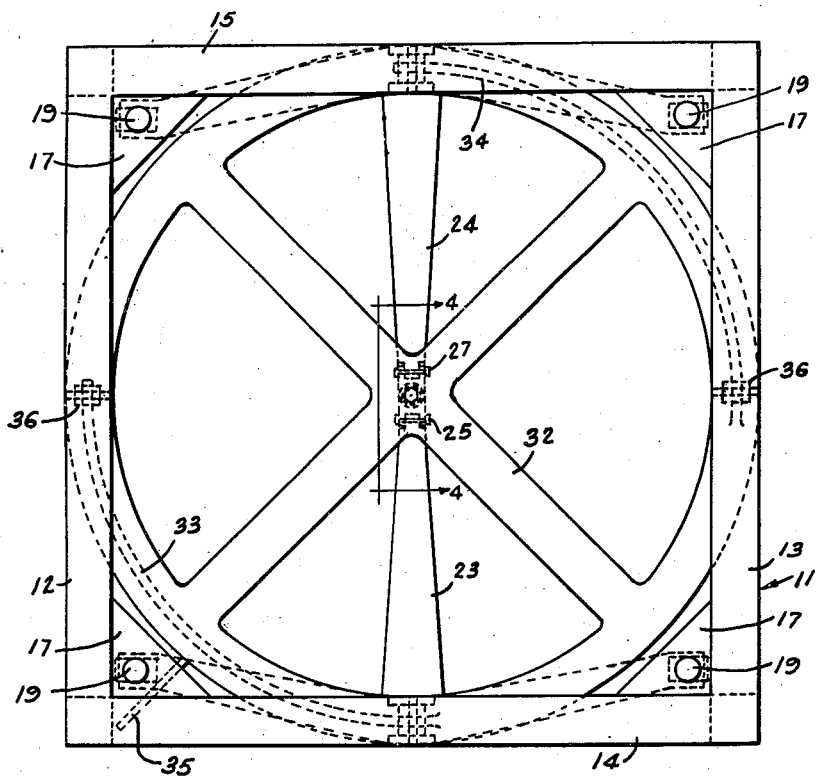
Fig-1-
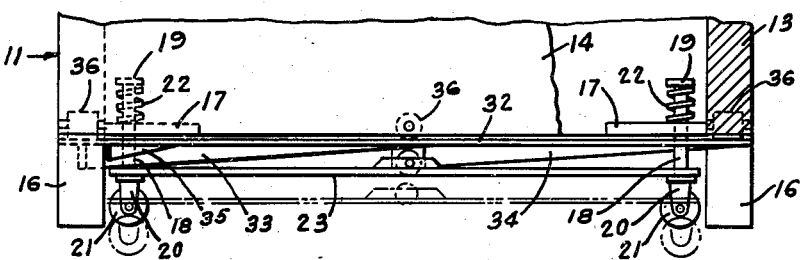
Fig-2-
INVENTOR
William C. Halley March 15, 1949.  W. C. HALLEY  2,464,503
ELEVATING CASTER DEVICE FOR FURNITURE
Filed April 5, 1946  2 Sheets-Sheet 2
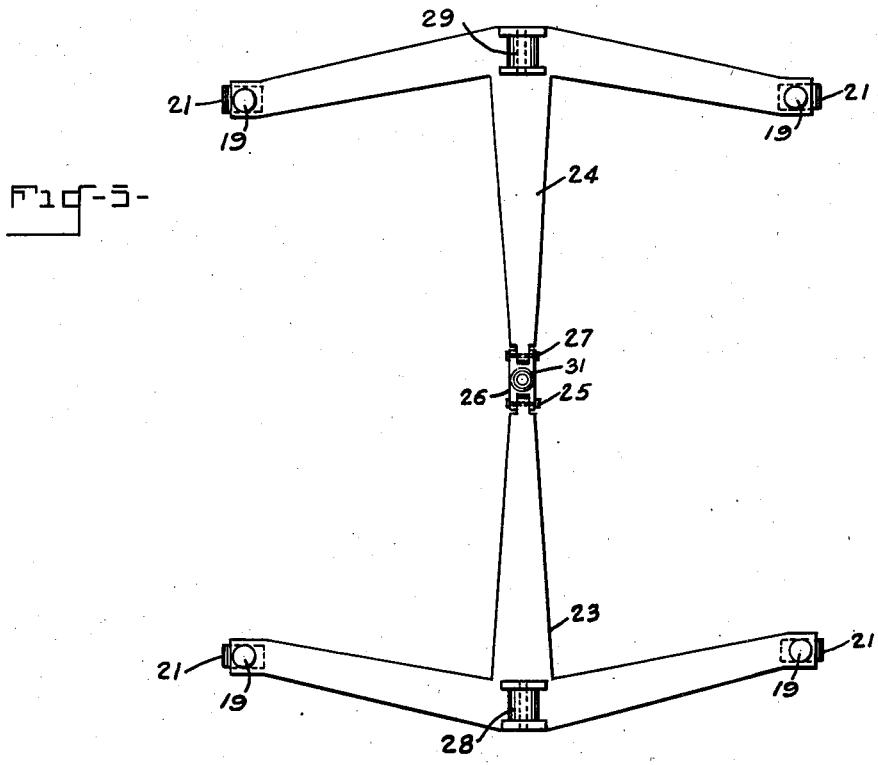
Fig-5-
Fig-4-
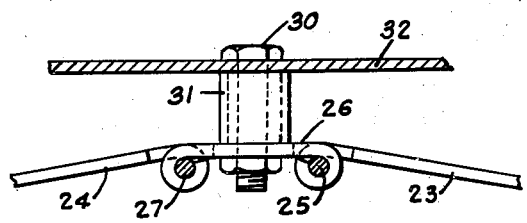
INVENTOR
William C. Halley Patented Mar. 15, 1949

2,464,503

UNITED STATES PATENT OFFICE 2,464,503

ELEVATING CASTER DEVICE FOR FURNITURE

William C. Halley, Mechanicsburg, Ohio

Application April 5, 1946, Serial No. 659,766

3 Claims. (Cl. 16—33)

1

This invention relates to furniture caster devices, and more particularly to a retractable caster structure for heavy furniture.

A main object of the invention is to provide a novel and improved caster structure for furniture wherein the caster elements are normally retracted from bearing contact with the floor and wherein said caster elements may be easily and quickly moved into bearing contact with the floor when it is desired to move the furniture.

A further object of the invention is to provide an improved retractable caster structure for heavy furniture, said structure being very simple, inexpensive to manufacture and to install, and being very efficient in operation.

Further objects and advantages of the invention will become apparent from the following description and claims, and from the accompanying drawings, wherein:

Figure 1 is a top plan view of the frame of a chair provided with a caster structure according to the present invention.

Figure 2 is a front elevational view, partly in cross-section, of the chair frame of Figure 1.

Figure 3 is a top plan view of a hinged bearing arm structure employed in the caster structure of Figures 1 and 2.

Figure 4 is a detail cross-sectional view taken on line 4—4 of Figure 1.

Referring to the drawings, 11 designates a chair bottom frame comprising parallel side bar members 12 and 13 and parallel front and rear bar members 14 and 15 rigidly secured to the side bar members. A depending supporting leg 16 is secured to each corner of the bottom frame 11, said supporting legs 16 being adapted to normally support frame 11 in parallel spaced relation to the floor.

Rigidly secured to the inside of each corner portion of frame 11 is a horizontal triangular plate member 17 through which is slidably and rotatably engaged a vertical center shaft 18 provided at its top end with a flanged head portion 19 and provided at its bottom end with a shouldered caster bracket 20 in which a caster wheel 21 is journaled. Encircling each caster shaft 18 and bearing between head 19 of the shaft and the sub-adjacent plate 17 is a coiled spring 22 which biases the shaft to a raised position wherein caster wheel 21 is normally raised out of contact with the floor.

Slidably engaging each of the front pair of caster shafts 18 and bearing on the shouldered bracket 20 thereof is the end portion of one of the lateral head arms of an inwardly and up-

2 wardly inclined T-shaped bearing arm structure 23. Slidably engaging each of the rear pair of caster shafts and bearing on the shouldered bracket 20 thereof is the end portion of one of the lateral head arms of a second inclined T-shaped bearing arm structure 24, similar to bearing arm structure 23. The end portion of the center arm of T-shaped member 23 is hinged at 25 to a center bracket element 26 and the end portion of the center arm of T-shaped member 24 is hinged at 27 to center bracket element 26 opposite hinge 25.

Journaled in T-shaped member 23 at the intersection of its arms is a roller 28 and similarly journaled in T-shaped member 24 at the intersection of its arms is a roller 29.

Pivotally secured to center bracket element 26 by a vertical bolt 30 and spaced above the bracket element by a spacer sleeve 31 is a large circular disc member 32. Depending from the peripheral portion of disc member 32 is a tapered inclined arcuate rib element 33 extending for an arc of 90° and being of a radius suitable to engage roller 28 responsive to counter-clockwise rotation of disc member 32, as viewed in Figure 1. An identical depending arcuate rib element 34 is provided on the disc member diametrically opposite rib element 33, element 34 being adapted to engage roller 29 responsive to the counter-clockwise rotation of the disc member. A handle member 35 projects radially from the periphery of the disc member for manually rotating said disc member.

Journaled in the bottom surface at the mid point of each of the frame bar members 12, 13, 14 and 15 is a roller 36 which is adapted to rotatively engage disc member 32 as said disc member exerts lifting pressure thereagainst responsive to the upward camming thrust exerted on the disc member as tapered rib 33 engages roller 28 and tapered rib 34 engages roller 29 to depress the caster wheels 21 against the floor.

In the normal position of the chair, handle 35 is positioned adjacent the depending supporting leg 16 at the corner defined by frame bar members 12 and 14, as shown in Figure 1. When it is desired to transfer the load of the chair to the caster wheels 21, as where it is desired to move the chair to a new location, handle 35 is rotated slightly less than 90° counter-clockwise, as viewed in Figure 1, until the handle is positioned adjacent the depending supporting leg 16 at the corner defined by frame bar members 13 and 14. The supporting legs act as stop means to limit rotation of the handle to intermediate these two positions.

To return the caster wheels to retracted position, handle 35 is rotated clockwise, as viewed in Figure 1, until it returns to its normal position, shown in said figure.

While a specific embodiment of a caster structure for a chair has been disclosed in the foregoing description, it will be understood that various modifications within the spirit of the invention may occur to those skilled in the art. Therefore, it is intended not to limit the use of the above-disclosed structure only to chairs, but to employ it with all types of furniture, and it is further intended that no limitations be placed on the invention other than as defined by the scope of the appended claims.

What is claimed is:

1. In an article of furniture, a bottom frame, a plurality of casters for said frame, said casters being each secured to said frame but being vertically movable with respect thereto, means biasing said casters to raised positions with respect to said frame, the bottom surfaces of said casters being above the bottom plane of said frame in said raised positions of the casters, a linkage supported on said casters, said linkage comprising a plurality of arms and means hinging together the arms substantially centrally of the frame, the outer end portion of each of said arms bearing on a caster, a horizontal plate member pivotally secured to the hinge means for rotation in a horizontal plane, and depending cam means carried by said plate member, said cam means being formed and arranged to wedgingly contact said arms responsive to rotation of said plate member, the upper surface of said plate member underlying portions of said bottom frame and being formed and arranged to elevate said frame responsive to the wedging contact of said cam means with said arms.

2. In an article of furniture, a bottom frame, a plurality of casters for said frame, each caster being secured to said frame but being vertically movable with respect thereto, means biasing said casters to raised positions with respect to said frame, a linkage supported on said casters, said linkage comprising a pair of identical inwardly and upwardly inclined T-shaped members, the outer end portions of the head arms of the T-shaped members each bearing on a caster, means hinging together the ends of the stem arms of the T-shaped member substantially centrally of the frame, a disc member pivotally secured to the hinge means for rotation in a horizontal plane, the upper surface of the disc member underlying the side portions of said frame, and depending cam means carried by said disc member adapted to wedgingly contact the head arms of the T-shaped members and exert a downward thrust thereon responsive to rotation of said disc member.

3. In an article of furniture, a square bottom frame, a depending support leg secured to each corner of the frame, a caster secured to each corner of the frame but being vertically movable with respect thereto, means biasing said casters to raised positions out of contact with the floor, a linkage supported on said casters, said linkage comprising a pair of substantially identical inwardly and upwardly inclined T-shaped members, the outer end portions of the head arms of the T-shaped members each bearing on a caster, means hinging together the ends of the stem arms of the T-shaped members substantially centrally of the frame, a disc member pivotally secured to the hinge means for rotation in a horizontal plane, the upper surface of the disc member underlying and being adapted to rotatively bear upwardly on the side members of the frame, and depending cam means carried by said disc member adapted to wedgingly contact the head arms of the T-shaped members and to exert a downward thrust thereon responsive to rotation of said disc member.

WILLIAM C. HALLEY.

REFERENCES CITED

The following references are of record in the file of this patent:

UNITED STATES PATENTS

| Number | Name | Date |
|---|---|---|
| 985,289 | Wood | Sept. 28, 1909 |
| 1,016,745 | Henrikson | Feb. 6, 1912 |
| 1,076,778 | Medart | Oct. 28, 1913 |
| 1,092,220 | Koch et al. | Apr. 7, 1914 |
| 1,161,007 | Overmyer | Nov. 16, 1915 |
| 1,219,071 | Bodnar | Mar. 13, 1917 |
| 1,556,735 | Tiffany | Oct. 13, 1925 |
| 1,626,819 | Hazlett | May 3, 1927 |